United States Patent [19]

Asaeda et al.

[11] Patent Number: 4,692,354

[45] Date of Patent: Sep. 8, 1987

[54] METHOD FOR PREPARING CERAMIC MEMBRANE FOR SEPARATION OF CONDENSED COMPONENT

[75] Inventors: Masashi Asaeda, 19-15,Kogo-naka 2-chome, Nishi-ku, Hiroshima City, Hiroshima Pref.; Kazutaka Mori; Hiroshi Makihara, both of Hiroshima, all of Japan

[73] Assignees: Masashi Asaeda; Mitsubishi Jukogyo Kabushiki Kaisha, both of Tokyo, Japan

[21] Appl. No.: 895,862

[22] Filed: Aug. 12, 1986

[51] Int. Cl.$^4$ ............................................. B05D 5/00
[52] U.S. Cl. .................................. 427/244; 427/336; 427/344; 427/377; 427/419.3
[58] Field of Search ..................... 427/244, 419.3, 344, 427/377, 336

[56] References Cited

U.S. PATENT DOCUMENTS

| | | | |
|---|---|---|---|
| 2,372,285 | 3/1945 | Marc et al. | 427/419.3 |
| 3,214,287 | 10/1965 | Mosng | 427/244 |
| 3,539,379 | 11/1970 | Mayer | 427/419.3 |
| 3,748,157 | 7/1973 | Moore | 427/344 |
| 3,752,689 | 7/1973 | Moore | 427/344 |
| 3,874,899 | 4/1975 | Miszenti et al. | 427/419.3 |
| 4,098,194 | 7/1978 | Miller et al. | 427/344 |
| 4,457,598 | 7/1984 | Shimabukuro et al. | 427/344 |

*Primary Examiner*—Norman Morgenstern
*Assistant Examiner*—Janyce A. Bell
*Attorney, Agent, or Firm*—Holman & Stern

[57] ABSTRACT

A method for preparing a ceramic membrane for the separation of a condensed component which is characterized by comprising the steps of impregnating pores of a ceramic porous material with an alumina sol produced by hydrolyzing an aluminum alcoholate or an aluminum chelate; immersing the ceramic porous material into an aqueous sodium silicate solution; and subjecting the ceramic porous material to a water vapor treatment in a high-temperature water vapor.

6 Claims, 5 Drawing Figures

METHOD FOR PREPARING CERAMIC MEMBRANE FOR SEPARATION OF CONDENSED COMPONENT

BACKGROUND THE INVENTION

1. Field of the Invention

The present invention relates to a method for preparing a ceramic membrane for use in the separation of a condensible component.

2. Description of the Prior Art

In order to utilize, for the separation of a condensed component, a porous diaphragm with ultrafine pores having an average pore diameter of 10 to hundreds Å which has been formed by sintering a metallic powder or a ceramic power or by compression-molding a powder of an organic synthetic resin such as a fluorine-contained resin, it is desirable that the porous diaphragm is molded into an optional shape, but in fact, such an optional molding is difficult. For this reason, for example, the following methods is taken in many cases: The thin porous diaphragm having the ultrafine pores is reinforced by the use of a porous material, which is high in a gas permeability, having a moderate thickness or by the use of a wire net so as to form a multi-layer structure and to thereby provide the diaphragm with an enough strength.

For example, for the purpose of molding the porous membrane having the multi-layer structure into a pipe shape, there are various methods. In general, the sheet-like multi-layer porous diaphragm is molded into a cylindrical shape, and butt welding or lap welding are then carried out at the edges of the diaphragm. However, the molding of the ceramic into the cylindrical shape is extremely difficult, because the ceramic is unflexible in contrast to a metal or the like. Further, with regard to a porous metal, its strength is lower due to being porous, i.e., owing to the existence of the pores therein, as compared with a nonporous material, in spite of the porous metal being within the category of the metal. Therefore, in the porous metal, a curvature radius within which its molding into the cylindrical shape is possible is limited, and it :s noticeably hard to mold it into a thin pipe.

Thus, as a means to solve such a difficulty, a process of molding the porous pipe is known which comprises concentrically disposing a pipe or a core metal inside or outside a porous supporting pipe, jetting a gas into a space portion between the porous supporting pipe and the pipe or the core metal and filling the space portion with a powder uniformly, while vibration is given to the porous supporting pipe and the pipe or the core metal, and compresively joining the filled powder in the space portion to the porous supporting pipe by means of static pressure molding in order to form the compresively joined layer of the powder on the porous supporting pipe (Japanese Patent Provisional Publication No. 77410/1975). In this method, however, the uniform filling of the powder and the preparation of the very thin membrane are poor, and in consequence, the above conventional method is difficult to practically perform.

SUMMARY OF THE INVENTION

The present invention has been achieved in view of such situations, and its object is to provide a method for preparing a ceramic porous membrane having very small pores of about 10 Å in diameter, and according to the present invention, a size and a shape of the ceramic porous membrane can be selected optionally.

That is, the present invention is directed to a method for preparing a ceramic membrane for the separation of a condensed component which is characterized by comprising the steps of impregnating pores of a ceramic porous material with an alumina sol produced by hydrolyzing an aluminum alcoholate or an aluminum chelate; immersing the ceramic porous material into an aqueous sodium silicate solution; and subjecting the ceramic porous material to a water vapor treatment in a high-temperature water vapor.

More specifically, the present invention is directed to a method for preparing ceramic membrane for the sepration of a condensed component which is characterized by comprising the steps of impregnating pores of a ceramic porous material with an alumina sol produced by hydrolyzing an aluminum alcoholate or an aluminum chelate; immersing the ceramic porous material into a 0.01 to 0.5 mol/l aqueous sodium silicate solution; and subjecting the ceramic porous material to a water vapor treatment at 95° to 100° C. for 0.5 to 5 hours.

BRIEF DESCRIPTION OF THE DRAWINGS

FIG. 2 (B) is an enlarged view of a part in FIG. 2 (A);

DESCRIPTION OF THE PREFERRED EMBODIMENTS

Figure 1:
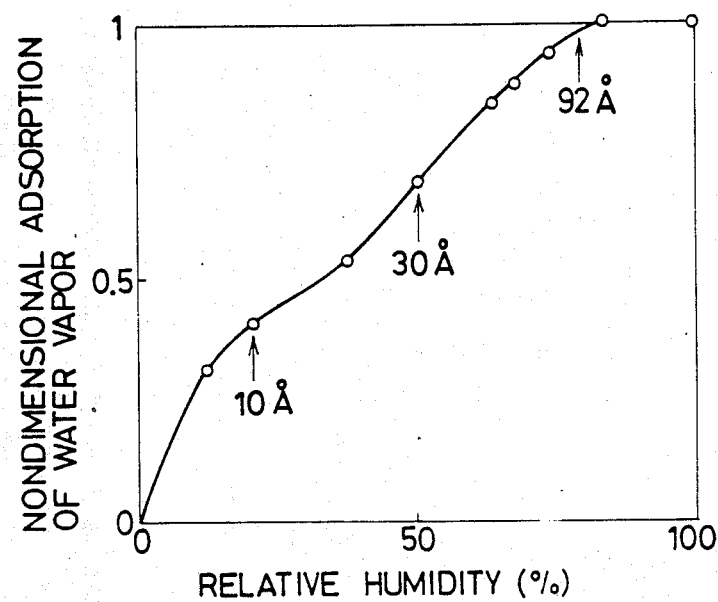
FIGS. 1 and 4 are graphs showing water vapor equilibrium adsorption curves of ceramic membranes prepared for tests in accordance with a method of the present invention.

In the method of the present invention, an optionally shaped porous material having relatively large pores (a pore diameter of which usually is 1,000 Å or more) such as foamed silica, sintered alumina or mullite is first impregnated with an alumina sol (AlOOH) produced by hydrolyzing an aluminum alcoholate or an aluminum chelate, and it is then immersed into an aqueous sodium silicate solution. Afterward, it is retained in a high-temperature steam. Next, the porous material is immersed into boiling water in order to wash and remove alkaline components therefrom.

By the above mentioned operation, the pores of the porous material are filled therewith, but one cycle of the operation described above is poor to inhibit cracks, which are caused by drying and contraction, and is insufficient to completely fill the pores with the alumina sol. Therefore, it is necessary to repeat the above mentioned operation several times for perfection.

Examples of the aluminum alcoholates used in the present invention include aluminum isopropoxide and aluminum-2-butyrate, and examples of the aluminum chelates include aluminum tris(ethylacetoacetate) and ethylacetoacetate-aluminum-diisopropylate.

According to the method of the present invention, it is possible to prepare the ceramic membrane having pores of 10 Å or less in diameter.

The employment of the ceramic membrane obtained by the method of the present invention permits separating a condensed component present in a gas. For example, when the separation of water content (water vapor) in air is contemplated, one side of the ceramic membrane is brought into contact with the air contaning water vapor, and on the other side thereof, a vacuum state is given for the suction of the water content, whereby the water content in the air is condensed in the pores of the ceramic membrane and comes out on the vacuum side. As a result, the water vapor content in the air is lowered. Therefore, such a membrane as just described can be applied to a dehumidifier in a closed system.

The ceramic membrane prepared by the method of the present invention has a good separate performance for a condensed component, though this performance varies slightly with the gas temperature and the content of the condensible component. Further, the method for manufacturing the ceramic membrane is easy, and in consequence, it is fair to say that the present invention is industrially beneficial.

Now, the present invention will be described in detail in reference to examples, but the latter do not intend to limit the scope of the present invention.

EXAMPLE 1

Kaolin and graphite were mixed with each other at a ratio of 2:1, and water was then added thereto. Afterward, molding was carried out to prepare a clay pipe one end of which was closed, the thus prepared pipe being 12 mm in diameter, 1.2 mm in thickness and 12 cm in length. The pipe was then dried in a chamber, and a temperature therein was raised up to 1,250° C. at a temperature rise rate of 200° C./h. Afterward, the pipe was maintained at 1,250° C. for 10 hours in order to obtain a clay sinter. In this case, the sintering operation was carried out in an air atmosphere. The obtained porous sinter product had a diameter of 10 mm, a thickness of 1 mm and a length of 10 cm, and each pore in the sinter had a diameter of 0.8 $\mu$m (8,000 Å), a pore volume being 0.2 cc/g.

Next, 5 g of aluminum isopropoxide was added to 100 g of water which had been maintained at 80° to 90° C., in order to hydrolyze aluminum isopropoxide. Then, 0.6 ml of concentrated nitric acid was added thereto, and the resultant mixture was maintained at 80° to 90° C. for 24 hours in order to accomplish deflocculation and to thereby obtain an alumina sol. Into the latter, the already prepared porous sinter was immersed for 5 minutes. Afterward, the porous sinter was immersed into a 0.1 mol/l aqueous sodium silicate solution for 1 minute and was then retained in water vapor at 100° C. for 1 hour. After this operation has been repeated 4 times, the sinter was immersed into hot water at 90° C. for 1 minute in order to wash and remove alkalis therefrom.

FIG. 1 shows the pore distribution in the finally prepared ceramic fine porous material, which pore distribution was calculated from the adsorption of the water vapor. In FIG. 1, the abscissa axis and the ordinate axis represent a relative humidity and a nondimensional adsorption of water vapor, respectively. They were measured at 32°4 C., and values of 94 Å, 24 Å and 10 Å in the drawing were pore diameters which had been calculated in accordance with the Kelvin formula regarding capillary condensation. It is apparent from FIG. 1 that the ceramic membrane prepared by the method of the present invention had pores of 10 Å or less in diameter. The above mentioned Kelvin formula can provide a pore diameter (condensation diameter) at the time when a component begin to condense, and it can be represented by the following formula:

$$r = -2V\sigma/RT\ln(P/P_0)$$

wherein
  r: pore radius
  $\sigma$: surface tension of the liquid
  V: molar volume of the liquid
  $P_0$: saturated vapor pressure, and
  P: pressure to cause capillary condensation The relative humidity at a certain temperature can be represented by the formula containing pressure factors of $P/P_0$, and by introducing certain values into the Kelvin formula and performing the calculation, the pore radius can be obtained. In FIG. 1, 10 Å, 30 Å and 92 Å which are indicated by arrows are pore diameters corresponding to about 13%, about 50% and about 80% of the relative humidity. The adsorption of the condensate is observed at 10 Å clearly, which fact means that the pores having a diameter of 10 ÅA are formed in the ceramic membrane of the present invention.

Figure 2:
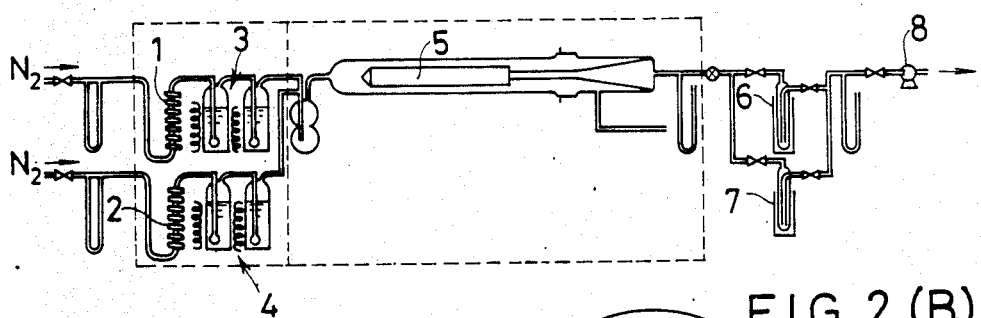
FIG. 2 (A) is a schematic view illustrating an apparatus for separating a condensible component which is used to evaluate the ceramic membranes prepared by the method of the present invention.
Figure 2:
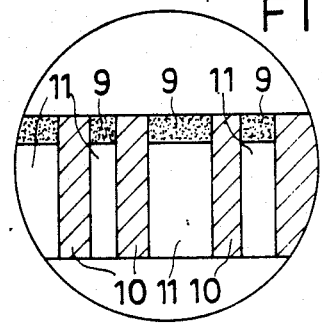

For this ceramic membrane, a condensible component separating performace evaluation test was carried out by the use of a water vapor separating test device shown in FIGS. 2(A) and 2(B). In FIG. 2(A), reference numerals 1 and 2 are helical pipes for heating a gas, and numerals 3 and 4 are condensible component gas addition sections. In this test, water (water vapor) was used as the condensible component. Numeral 5 is a condensible component separating section, numerals 6 and 7 are a condensible component condensing sections, and 8 is a vacuum pump. FIG. 2(B) is an enlarged view of the membrane portion in the condensible component separating section 5. In FIG. 2(B), numeral 9 is alumina, having fine pores, with which pores 11 is filled, and 10 is a substrate.

The test was carried out as follows: Water vapor was mixed with a nitrogen gas in the gas heating helical pipe 1 and the condensible component addition section 3, and afterward, vacuum suction was carried out via the condensible component separating section 5 by the vacuum pump 8. Then, the water vapor which had flowed through the condensible component separating section 5 was condensed by liquid nitrogen with which the condensible component condensing section 6 or 7 was filled. The thus condensed water was metered, whereby a permeation rate of water was measured.

Figure 3:
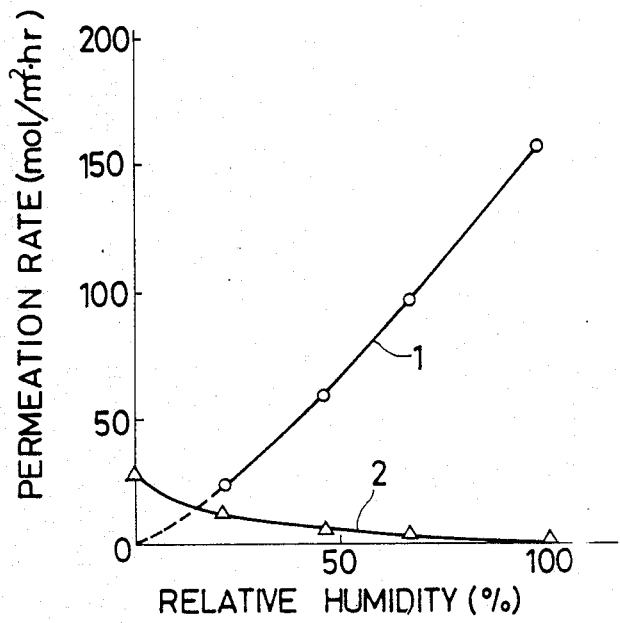
FIGS. 3 and 5 are graphs showing results of gas permeation tests by the use of ceramic membranes made for the tests.

The measurement results of the permeation rate of water are shown in FIG. 3. In this drawing, the abscissa axis and the ordinate axis represent a relative humidity (%) and a permeation rate (mol/m$^2$h), respectively, and a measurement temperature was 76.2° C. In FIG. 3, curves 1 and 2 represent a permeation rate of water vapor and a permeation rate of nitrogen, respectively. As is apparent from FIG. 3, in the case that the relative humidity was 20% or more, the permeation rate of water vapor is greater than that of nitrogen. Further, along with the increase in the relative humidity, the permeation rate of water vapor becomes higher and that of nitrogen become lower.

EXAMPLE 2

Figure 4:
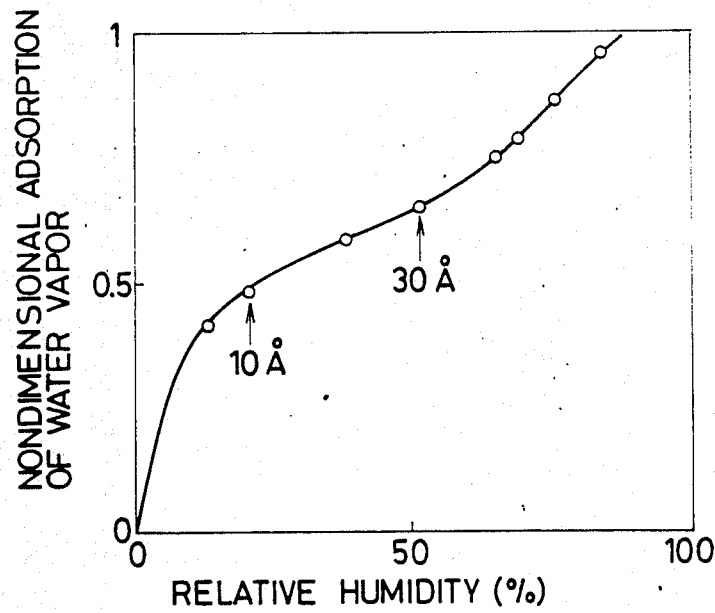

An alumina porous sinter having a pore diameter of 1,500 Å and a pore volume of 0.18 cc/g was impregnated three times with an alumina sol in the same manner as in Example 1, and it was then immersed into a 0.2 mol/l aqueous sodium silicate solution for 1 minute and was retained in water vapor at 100° C. for 1 hour. This operation was repeated 4 times cyclically. A water pavor equilibrium adsorption curve (32° C.) of the thus obtained ceramic membrane is shown in FIG. 4 in which the abscissa axis and the ordinate axis represent a relative humidity (%) and a nondimensional water vapor adsorption. In this drawing, there are shown 10 Å and 30 Å which are the values of pore diameters given in accordance with the Kelvin formula. As a result of the water vapor equilibrium adsorption curve measurement, it is apparent that the pore diameter of the obtained ceramic porous is smaller than 10 Å.

Figure 5:
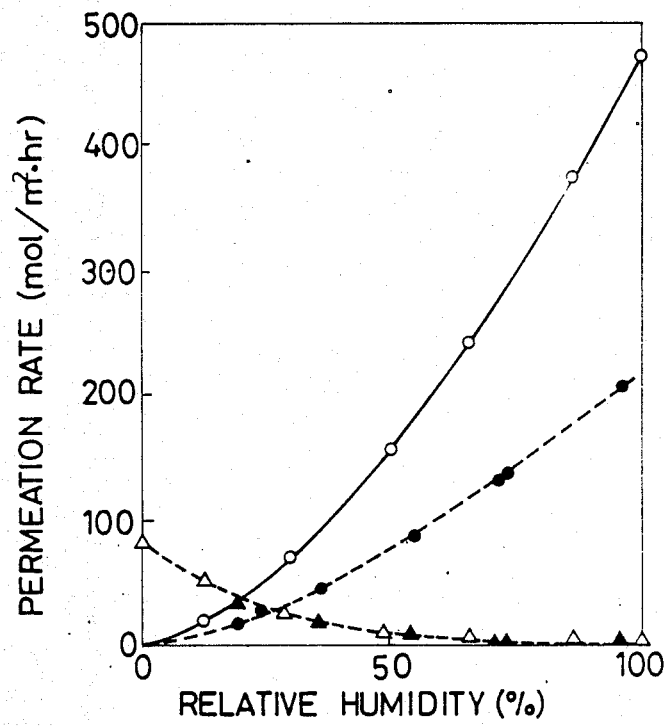

Next, for the obtained ceramic membrane, a condensible component (water vapor) separating performance test was carried out in the same manner as in Example 1. The test results are shown in FIG. 5 in which the abscissa axis and the ordinate axis represent a relative humidity (%) and a permeation rate (mol/m$^2$·h) In FIG. 5, a white circle, a white triangle, a black circle and a black triangle represent permeation rate data of water vapor at 76.8° C., air at 76.8° C., water vapor at 58.0° C. and air at 58.0° C., respectively. Also in this case, it is definite that when the relative humidity is 20% or more, water vapor permeates in a more amount than air. Further, along with the increase in the humidity, the permeation rate of air becomes lower but that of water vapor becomes higher. In addition, when the influence of the temperature on the amount of permeated water vapor was inspected, the amount of permeated water vapor at 76.8° C. was greater than that of permeated water vapor at 58.0° C. In consequence, it has been found that when the temperature is higher, the amount of permeated water vapor is greater

What is claimed is:

1. A method for preparing a ceramic membrane for the separation of a condensed component which is characterized by comprising the steps of impregnating pores of a ceramic porous material with an alumina sol produced by hydrolyzing an aluminum alcoholate or an aluminum chelate; immersing said ceramic porous material into an aqueous sodium silicate solution; and subjecting said ceramic porous material to a water vapor treatment in a high temperature water vapor.

2. A method for preparing ceramic membrane for the separation of a condensed component according to claim 1 which is characterized by comprising the steps of impregnating pores of a ceramic porous material with an alumina sol produced by hydrolyzing an aluminum alcoholate or an aluminum chelate; immersing said ceramic porous material into a 0.01 to 0.5 mol/l aqueous sodium silicate solution; and subjecting said ceramic porous material to a water vapor treatment at 95° to 100° C. for 0.5 to 5 hours.

3. A method according to claim 1 wherein said ceramic porous material is an optionally shaped porous material having relatively large pores (a pore diameter of which usually is 1,000 Å or more) such as foamed silica, sintered alumina or mullite.

4. A method according to claim 1 wherein said aluminum alcoholate is at least one compound selected from aluminum isopropoxide and aluminum-2-butyrate.

5. A method according to claim 1 wherein said aluminum chelate is at least one compound selected from aluminum tris(ethylacetoacetate) and ethylacetoacetate-aluminum-diisopropylate.

6. A method according to claim 2 wherein after said water vapor treatment, said ceramic porous material is immersed into boiling water in order to wash and remove alkaline components therefrom.

* * * * *